United States Patent [19]

Harley

[11] Patent Number: 5,143,473
[45] Date of Patent: Sep. 1, 1992

[54] SECURING DEVICE WITH FASTENING ELEMENT HAVING ROTATION STOPPING MEANS

[75] Inventor: David N. Harley, Dorset, England

[73] Assignee: Titus Tool Company, Limited, Iver, England

[21] Appl. No.: 658,614

[22] Filed: Feb. 21, 1991

[30] Foreign Application Priority Data

Feb. 22, 1990 [GB] United Kingdom ............... 9004003

[51] Int. Cl.⁵ .................. B25G 3/00; F16B 15/08
[52] U.S. Cl. .................. 403/231; 403/245; 411/354; 411/453; 411/456
[58] Field of Search .......... 411/451, 453, 454, 456, 411/460, 458, 475, 482, 394, 923; 403/6, 20, 231, 245, 407.1

[56] References Cited

U.S. PATENT DOCUMENTS

| 375,449 | 12/1887 | Hoffmeier | 411/460 |
| 1,891,895 | 12/1932 | Nagel | 411/453 |
| 4,047,822 | 9/1977 | Lehmann | 403/245 |
| 4,518,278 | 5/1985 | Koch | 403/245 |
| 4,599,011 | 7/1986 | Tashiro et al. | 403/245 |
| 4,957,386 | 9/1990 | Harley et al. | 403/407.1 |

FOREIGN PATENT DOCUMENTS

| 104284 | 4/1984 | European Pat. Off. |
| 266969 | 5/1988 | European Pat. Off. |
| 293765 | 12/1988 | European Pat. Off. |
| 307590 | 3/1989 | European Pat. Off. |
| 504900 | 5/1939 | United Kingdom |
| 757560 | 12/1953 | United Kingdom |
| 762302 | 11/1956 | United Kingdom |
| 778327 | 7/1957 | United Kingdom |
| 1251681 | 10/1971 | United Kingdom |

Primary Examiner—Neill R. Wilson
Attorney, Agent, or Firm—Lowe, Price, Le Blanc & Becker

[57] ABSTRACT

A securing device is provided which comprises a fastening element and a tightening member, the device being suitable for fastening furniture panels together. Features are incorporated in the fastening element which improve the quality of the joint which can be achieved between two panels. These include forming helically extending ribs on the leading end of the fastening element which enable it to be pushed into a bore in a member to be fastened, while turning it through a small angle to provide some resistance to axial forces tending to pull the fastening element out. Other features are fins which act to stop the insertion of the fastening element at a predetermined depth and which engage with the second panel to inhibit rotation of the fastening element, the fins being arranged in such a way that they disappear into the second panel allowing the two panels to come into full contact with one another when the joint is secured.

17 Claims, 2 Drawing Sheets

SECURING DEVICE WITH FASTENING ELEMENT HAVING ROTATION STOPPING MEANS

BACKGROUND OF INVENTION

1. Field of the Invention

This invention relates to securing devices of the sort which may be used in fixing furniture panels together. More particularly, but not exclusively, it relates to the type of securing device which comprises a fastening element which may be used in conjunction with a tightening member of the rotating cam lock type.

2. Description of the Prior Art

Securing devices are known which comprise a fastening element in the form of a pin and a tightening member in the form of a rotating cam lock. The pin is inserted in a first panel to a predetermined depth and fixed. In this position its head and a portion of its body protrude from the panel. The protruding parts of the pin are passed into a bore in a second panel, which is to be joined to the first, where the head of the pin engages inside the cam lock positioned in a recess in the second panel. The cam lock has a camming surface which acts to draw the pin inwardly as the lock is turned, thus drawing the two panels together.

The pins used in this type of securing device are generally made from turned steel and typically have a central body portion of relatively large diameter and a threaded end portion of smaller diameter for insertion in the first panel. The change in diameter between the body portion and threaded end portion acts as a stop to limit insertion of the pin in the first panel to the required predetermined depth. At the opposite end of the pin is a head and narrower neck portion connecting the head to the body portion, the head and neck being shaped to co-operate with the camming surface of the rotating cam lock. An example of this type of prior art pin is shown in FIG. 1.

These steel pins are relatively costly to manufacture, requiring turning to provide the different diameter portions and the screw thread. A cheaper pin may be manufactured from die-cast Mazak, and the use of this material has several advantages in addition to reduced cost. For instance, the tolerances achievable in die-casting are much smaller than those which can be attained in turning steel pins so that it is possible to manufacture die-cast pins which have a much better fit with the cam lock. Features may also be incorporated in the pin design which cannot be achieved by turning.

An example of a feature which can be included if the pins are die-cast is a flared skirt to act as the stop which limits insertion of the pin in a panel to a predetermined depth. An example of this type of prior art pin is shown in FIG. 2. Using a skirt in this way removes the need for a large diameter body portion of the pin, so that the bore in the second panel through which the protruding body portion of the pin passes can also be reduced in size, making easier the preparation of the panels prior to fixing.

However, the use of the flared skirt does give rise to some disadvantages. For instance, in order for the panels to lie in full contact with one another it is necessary to counter-sink the bore in the second panel to accommodate the skirt of the pin, thus necessitating a further step in the preparation of the panels. Unless the counter-sinking is very accurate it is possible that the edge of the skirt may protrude slightly, giving rise to a gap between the panels when
they are fixed.

SUMMARY OF THE INVENTION

The invention aims to overcome, at least in part, some of the disadvantages of the prior art described above.

According to a first aspect of the invention there is provided a securing device for use in firmly fixing two panel members together, the device comprising a fastening element and a tightening member, wherein the fastening element has end portions adapted for insertion in bores in respective ones of said panel members and is provided with stop means to limit insertion of a first one of said end portions in its respective bore to a predetermined depth, said stop means comprising a plurality of fin members on the surface of the fastening element arranged so that one end of each fin member butts up against a portion of the surface of the panel member peripheral to the opening of said respective bore when said first end portion is inserted therein, the other end of each fin member being adapted to cut into the wall of the other bore during fixing of the two panel members, thereby facilitating full contact between the panel members when they are fixed together.

According to a second aspect of the invention there is provided a securing device comprising a fastening element which has an end portion adapted to be forced into a bore in a member to be fastened, the end portion being formed with a plurality of helically extending ribs.

According to a further aspect of the invention there is provided a securing device for use in firmly fixing two members together, the securing device comprising a fastening element and a tightening member, wherein the fastening element has end portions adapted for insertion in bores in respective ones of said members, a first one of said end portions being adapted to be forced into its respective bore and the fastening element being formed with means to inhibit rotation of the fastening element after insertion by engaging in the material of the wall of a bore.

Although the invention has the three separate aspects mentioned above, they each co-act with one another in the embodiment which will be described, and so the various combinations of them are regarded as respective inventions also, as is reflected in the claims to such combinations included in the claims hereof.

BRIEF DESCRIPTION OF THE DRAWINGS

In order that the invention may be more fully understood an embodiment thereof will be described, by way of example, with reference to the accompanying drawings, wherein.

DESCRIPTION OF THE PREFERRED EMBODIMENT

Figure 1:
FIG. 1 shows an example of a prior art turned steel pin.
Figure 2:
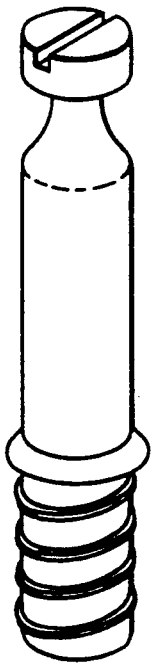
FIG. 2 shows an example of a prior art die-cast pin with a flared skirt.
Figure 3:
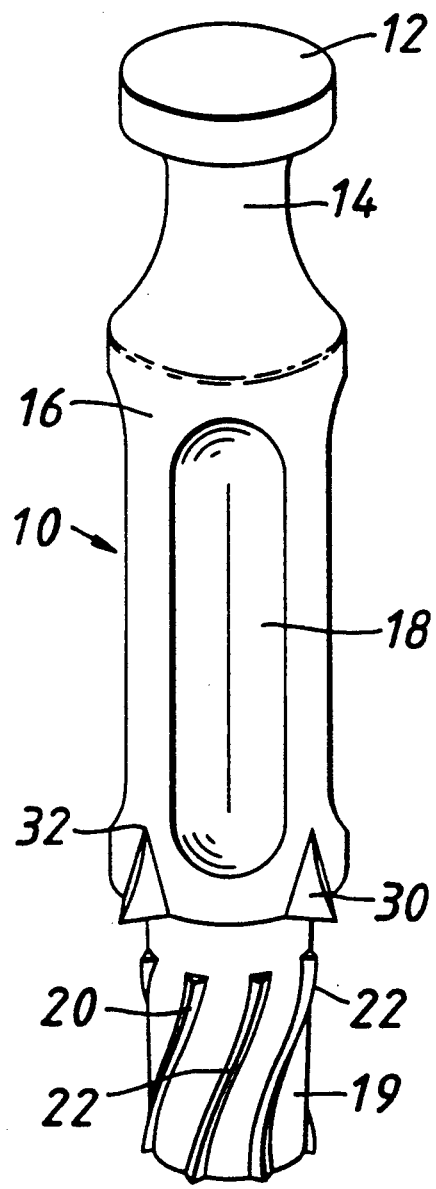
FIG. 3 shows a pin comprising part of a securing device according to the present invention.

FIG. 3 shows a fastening element in the form of a pin 10 for use in association with a rotating cam lock device for fixing panels together. The pin 10 is made from die-cast material and is generally cylindrical with a head 12 provided at one end. Below the head 12 the pin 10 narrows to a neck portion 14 and then tapers outwardly to the diameter of the main body 16 of the pin 10. The head 12 and neck 14 are shaped to co-operate with a slot and camming surface of the rotary camming lock with which the pin 10 is intended for use (not shown). The illustrated pin 10 is provided with recessed portions, or fluting, 18 on the main body 16. These reduce the weight and cost of material used in making the pin 10, but are not considered to be essential features of the invention.

At the opposite end of the pin 10 to the head 12, the leading end 19, a number of ribs 20 are provided which extend around the leading end 19 of the pin 10 in a helical manner for a short distance along the pin 10. The ribs 20 are generally triangular in cross-section, and are arranged to form a series of biting edges or teeth 22 around the leading end 19. The ribs 20 are dimensioned so that there is a slight outward taper in the external diameter of the leading end 19 and ribs 20 from the end of the pin 10 towards the body portion 16.

The leading end 19 of the pin 10 is intended to be pushed into a pre-formed bore in the panel or other item into which it is to be secured, by a force applied axially. The helically extending ribs 20 on the leading end 19 are arranged to rotate the pin 10 as it is pushed into the bore, the teeth 22 cutting out helical grooves in the wall of the bore as the pin 10 moves inwardly. The angle through which it will turn is determined by the pitch of the ribs 20.

In the illustrated embodiment the start and finish point of each rib are separated by an angle of 90°, and the mean thread angle of the helix is between 40° and 60°.

Once in position in the bore, the ribs 20 provide some retention for the pin 10 against axial forces which might otherwise tend to pull the pin 10 out. The pin 10 must be twisted back through the same angle as it turned during insertion to be removed from the bore.

It will be apparent that this type of leading end 19 on a pin 10 is suitable for use in many applications, and is not restricted to use in the pin and rotating cam lock securing device of this embodiment.

Referring again to FIG. 3, it can be seen that the lower part of the body portion 16, adjacent the leading end portion 19, is provided with a number of fins 30. Each fin is of generally triangular cross-section at the lower end of the main body 16, the triangular faces extending in a plane generally perpendicular to the axis of the pin 10. Each fin 30 extends axially along the pin 10, tapering to a point 32 some distance along the body portion. The fins 30 perform two functions during use of the securing device, as will now be described.

As previously described in relation to the prior art, a pin which is to be used to secure panels together in conjunction with a rotating cam lock must be inserted in the first of the panels to a predetermined depth. The prior art pins described previously were provided with stops to achieve this, in the form of a change in diameter either as a step or a flared skirt. In the present embodiment the stop is provided by the flat triangular bases of the fins 30, which protrude from the lower part of the main body portion 16 of the pin 10, above the leading end 19. When the leading end 19 of the pin is pushed into a bore in a panel the bases of the fins 30 butt up against the panel surface surrounding the opening of the bore and ensure that the pin is not driven too far into the panel.

Figure 4:
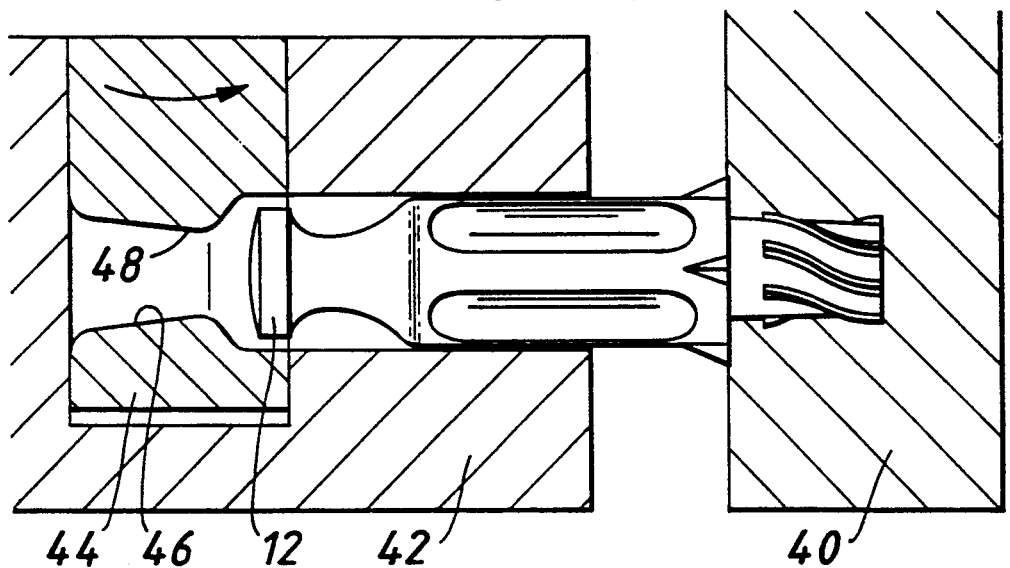
FIG. 4 is a diagrammatic view of a securing device according to the invention in pre-tightened condition.
Figure 5:
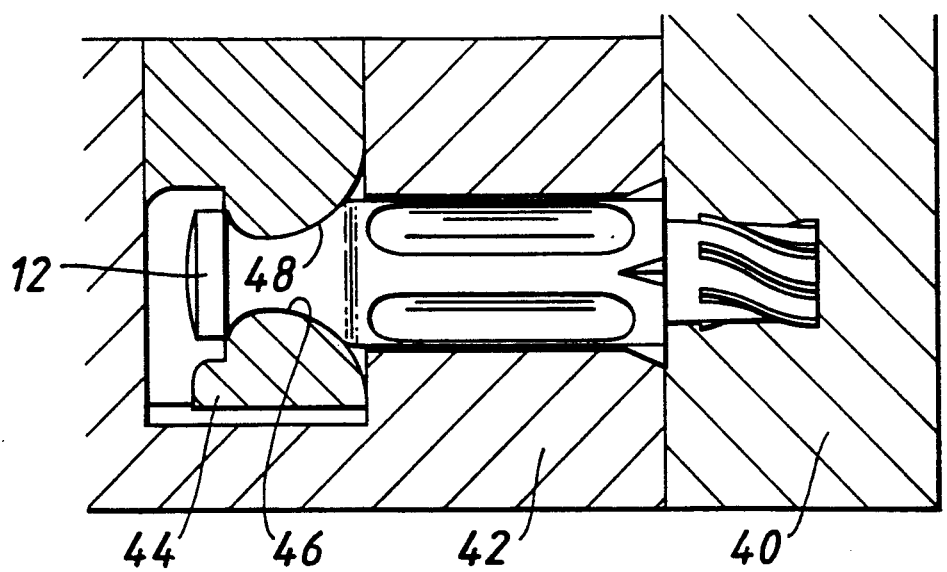
FIG. 5 is a diagrammatic view of the securing device of FIG. 4 once tightened.

Referring to FIGS. 4 and 5 the securing of the joint between two panels will be described. The part of the pin 10, which protrudes from the first panel 40, is passed through a pre-formed bore in the second panel 42 until its head 12 engages inside the rotating cam 44 lock positioned in a recess there. This is shown in FIG. 4. As the lock is turned the camming surfaces 46, 48 act on the head 12 and neck 14 of the pin 10 drawing it inwardly and thus pulling the two panels together. As the two panels are pulled together the tapered points 32 begin to bite into the edge of the bore in the second panel. As the joint is tightened the fins 30 are pulled further into the second panel until they are completely embedded, and the panels lie in full contact with one another as shown in FIG. 5.

Because the fins 30 extend axially along the pin 10 they resist rotational movement of the pin 10 which may, for instance, be caused by rotation of the cam lock. The combination of the helically extending ribs 20 on the leading end 19 of the pin 10 and the fins 30 therefore acts to ensure a strong joint, resistant to both axial and rotational forces.

Moreover, the shape of the fins 30 is such that they become completely embedded in the second panel without the need for the bore to be countersunk. As the fins 30 can "disappear" into the second panel in this way, the two panels can readily be secured in close and complete contact with each other.

It is envisaged that the functional effects of the fin members described above may be achieved with shapes other than that of a tapering triangular cross-section. For instance the fin members may be provided in the form of simple axially extending splines.

The invention has been described in relation to a securing device comprising a pin and rotating cam lock arrangement, but it is not intended that it should be limited as such. It will be apparent that many modifications are possible within the broad ambit of the invention, and all such modifications are intended to be incorporated herein.

I claim:

1. A securing device for use in firmly fixing two panel members together, the device comprising a fastening element and a tightening member, wherein the fastening element has a longitudinal axis and end portions adapted for insertion in bores in respective ones of said panel members and is provided with stop means to limit insertion of a first one of said end portions in its respective bore to a predetermined depth, said stop means comprising a plurality of fin members on the surface of the fastening element arranged so that one end of each fin member butts up against a portion of the surface of the panel member peripheral to the opening of said respective bore when said first end portion is inserted therein, the other end of each fin member being adapted to cut into the wall of the other bore during fixing of the two panel members, thereby facilitating full contact between the panel members when they are fixed together by action of the tightening member on the second end portion of the fastening element.

2. A securing device as claimed in claim 1 wherein each of said fin members is axially aligned on the surface of the fastening element and tapers to a point at its end distal from said first end portion.

3. A securing device as claimed in claim 1 wherein each of said fin members has a generally triangular cross-section in a plane substantially perpendicular to the axis of the fastening element.

4. A securing device as claimed in claim 1 wherein the first end portion of the fastening element is adapted to be forced into its respective bore, said first end portion being formed with a plurality of helically extending ribs.

5. A securing device as claimed in claim 4 wherein the pitch of the helically extending ribs is such as to rotate the fastening element as it is forced into said bore.

6. A securing device as claimed in claim 4 wherein the external diameter of the end portion and ribs increases with distance from the leading end of the end portion.

7. A securing device as claimed in claim 4 wherein each of the ribs has a generally triangular cross-section in a plane substantially perpendicular to the axis of the fastening element.

8. A securing device as claimed in claim 7 wherein the first end portion acts as a leading end of the fastening element and is adapted to be forced into its respective bore, the fastening element being provided at a location other than said first end portion with means to inhibit rotation of the fastening element after insertion by engaging in the material of the wall of a bore.

9. A securing device according to claim 8 where the means to inhibit rotation comprises said fin members.

10. A securing device for use in firmly fixing two members together, the securing device comprising a fastening element and a tightening member, wherein the fastening element has a longitudinal axis and end portions adapted for insertion in bores in respective ones of said members, a first one of said end portions acting as a leading end of the fastening element and being adapted to be forced into its respective bore in a first one of said members, and the fastening element being provided at a location other than said first end portion with means to inhibit rotation of the fastening element after insertion by engaging in the material of the wall of the bore in the second of said members, wherein the two members are fixed together by action of the tightening member on the second end portion of the fastening element.

11. A securing device as claimed in claim 10 wherein said first end portion is formed with a plurality of helically extending ribs.

12. A securing device as claimed in claim 11 wherein the pitch of the helically extending ribs is such as to rotate the fastening element as it is forced into said bore.

13. A securing device as claimed in claim 11 wherein the external diameter of the end portion and ribs increases with distance from the leading end of the end portion.

14. A securing device as claimed in claim 11 wherein each of the ribs has a generally triangular cross-section in a plane substantially perpendicular to the axis of the fastening element.

15. A security device as claim in claim 10 wherein the means to inhibit rotation comprises a plurality of fin members on the surface of the fastening element.

16. A securing device as claimed in claim 15 wherein each of said fin members is axially aligned on the surface of the fastening element and tapers to a point at its end distal from said first end portion.

17. A securing device as claimed in claim 15 wherein each of said fin members has a generally triangular cross-section in a plane substantially perpendicular to the axis of the fastening element.

* * * * *